Nov. 4, 1969   E. H. SCHWARTZMAN   3,476,451
FLUID BEARING SYSTEM
Filed Feb. 7, 1966                    4 Sheets-Sheet 1

INVENTOR.
EVERETT H. SCHWARTZMAN
BY
Nilsson, Robbins & Anderson
ATTORNEYS.

Nov. 4, 1969

E. H. SCHWARTZMAN 3,476,451

FLUID BEARING SYSTEM

Filed Feb. 7, 1966

INVENTOR.
EVERETT H. SCHWARTZMAN
BY
Nilsson, Robbins & Anderson
ATTORNEYS.

INVENTOR.
EVERETT H. SCHWARTZMAN
BY
Nilsson, Robbins & Anderson
ATTORNEYS.

Nov. 4, 1969  E. H. SCHWARTZMAN  3,476,451
FLUID BEARING SYSTEM
Filed Feb. 7, 1966  4 Sheets-Sheet 4
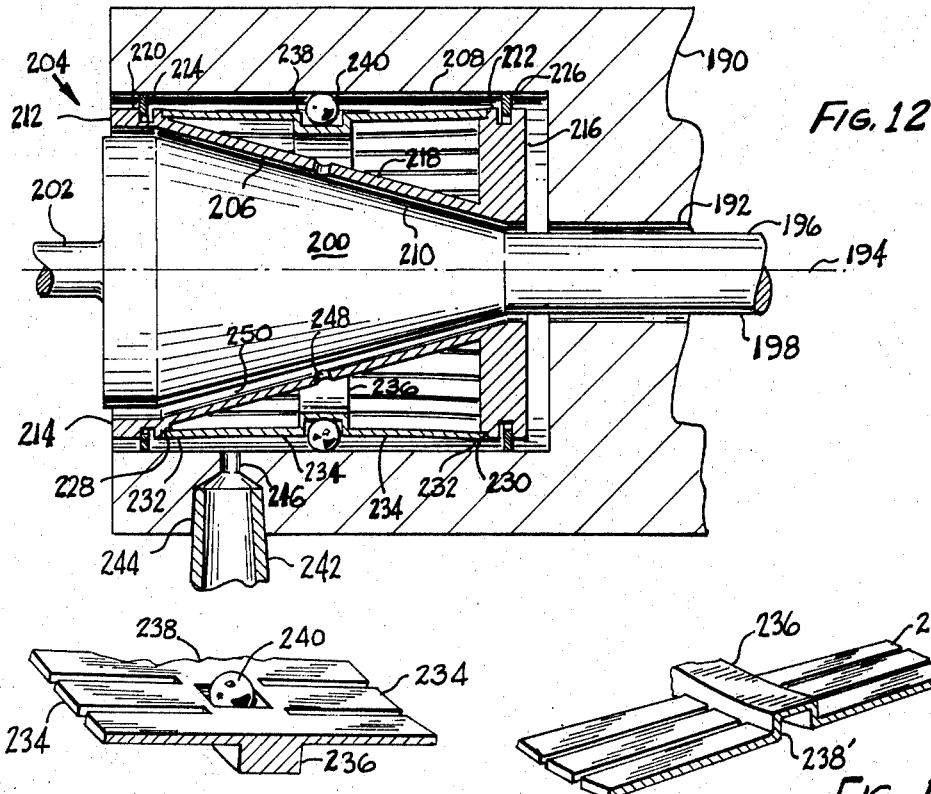
FIG. 12
FIG. 13
FIG. 14
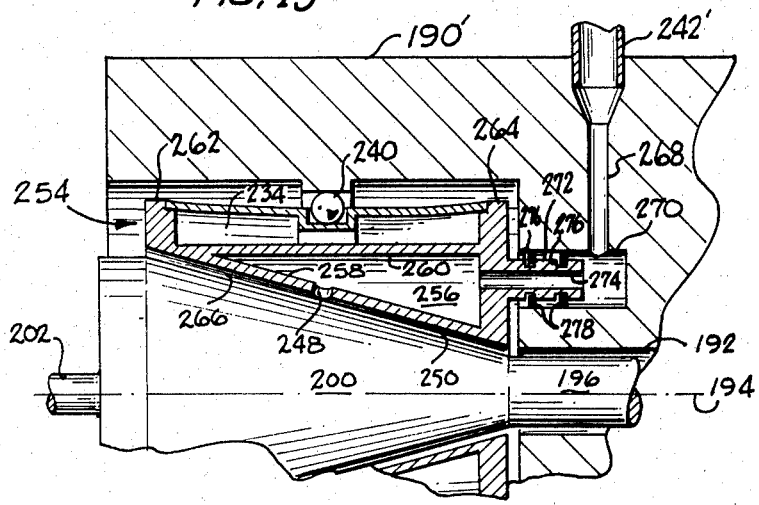
FIG. 15
INVENTOR.
EVERETT H. SCHWARTZMAN
BY
ATTORNEYS ated Nov. 4, 1969

United States Patent Office 3,476,451
Patented Nov. 4, 1969

3,476,451
FLUID BEARING SYSTEM
Everett H. Schwartzman, 457 34th St.,
Manhatttan Beach, Calif. 90266
Continuation-in-part of application Ser. No. 284,791,
May 29, 1963. This application Feb. 7, 1966, Ser.
No. 525,610
The portion of the term of the patent subsequent to
May 3, 1983, has been disclaimed
Int. Cl. F16c 17/16, 29/02, 1/24
U.S. Cl. 308—122     11 Claims

ABSTRACT OF THE DISCLOSURE

Various forms of a gas bearing structure are disclosed for supporting a shaft in relation to an external frame, to accommodate rotary motion therebetween. The shaft is affixed to a journal (incorporating opposed conical sections) which is matingly received in a bearing member to define a gas space therebetween. A support structure in turn receives the bearing member, again defining a gas space therebetween. Channels are provided to accommodate the flow of gas into the gas spaces and frictional engagement means is provided to dissipate energy from the structure thereby providing stable operation.

---

This invention relates generally to bearings for rotary members and more particularly to bearings of the character to be lubricated by a thin film of gas or other fluids including liquids.

This application is a continuation in part of the copending United States Patent 3,249,390, issused May 3, 1966, from application Ser. No. 284,791, filed by applicant herein on May 29, 1963.

In modern technology there occur many instances in which the contact of a rotary member with its support must be lubricated but in which the environment of the journal and bearing precludes the utilization of conventional lubricants. For example, in cyrogenic environments ordinary liquid state lubricants such as petro-lubricants or silicone products become unacceptably viscous or solid. In some such instances a flat molecule solid lubricant such as graphite can be adapted for use; however, the utilization of such solid lubricants is obviously very limited.

Similarly, extremely high temperatures preclude the use of conventional lubricants because of vaporization and thinning effects.

Other restrictive or prohibitive environments for conventional lubricants include chemically active ones wherein the lubricant would deleteriously react with the chemical; a well-known example is an oxygen environment which is explosively reactive with even traces of petro-lubricants. A further example of an environment in which conventional lubricants are generally precluded is a radioactive environment in which typically the lubricant is radiologically chemically altered and loses its lubricating characteristic.

Although the present invention finds particularly advantageous application in the filed of gaseous state bearing support and lubrication, and although, in the cause of clarity and brevity of presentation, much of the following description and discussion of examples relates thereto, it is to be understood that the advantages of the invention are equally well manifest in other fields where the same or substantially the same principles of fluid mechanics apply. Examples of utilization of the invention in such other fields include the use of low viscosity liquid metals and other liquids, usually elmental or otherwise chemically simple, which, although not lubricants in the conventional sense, can be utilized in accordance with the principles of the present invention to function as lubricating and bearing supporting fluids.

In recent years considerable effort has been expanded toward developing gas lubricated bearings to provide a cure for the deficiencies, such as those noted above, of the conventionally lubricated bearings. In general the lubrication is achieved by containing a thin film (approximately 0.0001 inch) of gas between an accurately machined shaft journal and the bearing. The result has been to provide bearings for special applications which are substantially insensitive to even super extremes of temperature. In addition since there is no "contact" between the solid parts there is no coulomb friction or heating therefrom and consequently no wear from such effects. The gas lubricating bearing consequently may be operated at very high speeds with a very long life of exceedingly stable performance characteristics.

The mechanics of the gas film is discussed at great length in mechanical engineering and physical society journals in recent years and need not be treated with any depth here. Two basic approaches to the mechanization of gas lubricated bearings, some generic and specific deficiencies and limitations of each, and the departure, in some respects, of the present invention from these approaches will be briefly discussed.

The two basic approaches so indicated are usually labeled "hydrostatic" and "hydrodynamic." In the first the gas under a predetermined pressure is continuously supplied to the bearing interspace; in the hydrodynamic case the gas film is self-maintaining when relative tangential velocities of approximately 50 feet per second and greater are reached, and may, when desired, be totally isolated from other sources of gas. This capability to be sealed off causes the hydrodynamic bearing to be attractive in such applications as reference gyros, for example, in satellites and missile guidance, where the carrying of or maintaining of a source of pressurized gas would be "costly."

However, the machining tolerances for the hydrodynamic case are significantly more stringent than for the hydrostatic case since the bearing interspace gap must be less than .0001 inch for the hydrodynamic bearing; and the small gap gives rise to a detectable viscous friction at high bearing speeds which is manifest by the drag on the rotary shaft at such speeds. Further the self-maintaining of the film pressure incumbently limits the versatility of the load capability and selection of critical (resonant) angular speeds for the bearing.

Machining tolerances for the manufacture of hydrostatic bearings though relaxed with respect to those required for the hydrodynamic type are still stringent. Furthermore the gas feed into the bearing interspace must in some cases be angularly symmetric in order to support the rotary shaft and to preclude imbalance with respect thereto. As implied above, however, the hydrostatic approach provides a more versatile and stable bearing because of its control ability and larger spacings.

In accordance with the best of the developments of the prior art, support against both axial and radial thrusts in gas lubricated bearings can be achieved by utilizing a pair of juxtaposed cylindrical surfaces and a pair of juxtaposed radially disposed surfaces wherein one surface of each pair is on the shaft and its juxtaposed counterpart is on a stationary frame or housing. There is no appreciable cooperation between the two bearing pairs, their supporting forces being mutually orthogonal.

A generic deficiency or limitation of fluid supporting bearings heretofore available is that regardless of the machine tolerances and regardless of the care with which the shaft is loaded, a finite rotary imbalance exists which causes an oscillation in cooperation with the elastic restoring force of the supporting fluid film. In practice the supporting film has a relatively low "spring" constant; and the resonant or critical speed of the rotary shaft is so low as to be a severe limitation on high speed utilizations of gas lubricated bearings. The severity of the resonance problem is caused by the fact that the near zero viscous friction of the film affords near zero damping of the oscillating bearing. Consequently it oscillates without limit until it strikes the stationary bearing or bushing. Typically the resulting coulomb friction precludes driving the shaft above the critical frequency or it causes destructive heating and wear, or both.

Another difficulty generally suffered by such bearing systems heretofore available is loss of film pressure with resulting metal to metal contact at certain speeds due to bearing "whirl" the phenomenon of which in gas bearings is believed caused by the rotating shaft being disposed, because of its weight, off-center with respect to the axis of the stationary bushing. This means the shaft is closer to the bushing at one point than at others and experiences an angularly non-balanced viscous drag. This drag, or its reaction, is in a direction opposite to that of the shaft rotation and causes a rotation, effectively, of the angularly unsymmetric disposition of the shaft. The whirl rotation, being due to the reverse-directed viscous drag, is contra to the shaft rotation and is seen by the support film as a reduction in the shaft velocity. Consequently, as the whirl velocity increases, and being opposite to the shaft rotation, a significant degradation of the support capability of the fluid film may occur and often results in undesired metal to metal bearing contact at a high shaft speed.

The restoring force and whirl resistance of the film may sometimes be influenced to some degree by the fluid pressure, particularly in the hydrostatic case; and the mass of the shaft may be minimized in order to increase the critical speed. However, these often represent compromises in the stability and load capabilities of the bearing and do not constitute a general solution.

It is therefore an object of the present invention to provide a fluid supported and lubricated bearing and method which are not subject to these and other limitations and disadvantages of the prior art.

It is another object of the present invention to provide a gas lubricated bearing and method which are not subject to these and other limitations and disadvantages of the prior art.

It is another object to provide such a bearing system in which a single pair of juxtaposed surfaces provides support against both axial and radial thrust.

It is another object to provide such a bearing system in which the gas or other fluid film thickness in both the radial and axial direction is adjustable by the axial movement of a single one of such surfaces.

It is another object of the present invention to provide such a bearing system in which frictional damping is coupled to the radially oscillating shaft without solid-to-solid contact between the rotating shaft and its supporting structures.

It is another object to provide such a bearing system in which the allowable amplitude of radial oscillation of the shaft at critical frequency without solid-to-solid contact is increased without increasing the quiescent thickness of support film.

It is another object to provide such a bearing system in which the thickness of the film is selectively self-adjusting or extrinsically adjustable or, cooperatively, both.

Briefly, these and other objects and advantages are achieved in accordance with the structural aspects of one example of the invention which includes a central shaft having a spaced pair of conical journals thereon, each of which is a figure of revolution about the axis of the shaft and which are oppositely directed with respect to a plane perpendicular to the axis. Radially surrounding each of the conical journals is a bushing having a conical internal bearing surface which is juxtaposed with respect to its respective shaft journal and spaced therefrom by a lubricating fluid film thickness. Both of the conical bushings are supported by a frame or housing member that has in this particular example, no rotational freedom with respect thereto.

In this particular example one of the bushings is radially spring-supported, by an all metal structure, so that it has a radial freedom of motion within the frame member. The motion of the bushing permitted by this freedom is oscillatory with its own resonant frequency due to its supporting springs and mass. However, a coulomb friction damping contact is made between the spring support bushing and the frame member to damp its radial oscillatory motion.

The other conical bushing is not, in this example, radially spring supported, but is provided with an axial freedom of motion within the frame member. The axial motion is determinative of the thickness of the conical supporting films, and the motion is axially biased by a spring or fluid pressure in a direction toward minimizing the film thickness, this bias being counterbalanced by the pressure of the dynamic film.

In operation, again briefly, oscillations of the rotary shaft drive the radially "floating" bearing through the supporting film "spring" as a linkage. This permits the shaft a greater amplitude of oscillation without effectively increasing the thickness of the film. At the same time the coulomb friction experienced by the bearing bushing is coupled back through the fluid film linkage to the radially oscillating shaft, thereby subtracting from its oscillatory energy without solid-to-solid contact. The natural frequency of the suspended bushing is selected to be relatively low so that once the shaft is passed through its critical frequency, there are no further resonance problems; and the shaft may be rotated at higher frequencies with ever decreasing oscillation amplitude.

A particular example of another deficiency of conventional bearings is in precision surface grinding applications wherein bearing noise is substantially always present and is manifest as imperfections or "noise" on the ground surface. This occurs because the bearings, typically ball bearings, are inherently imperfect and drive the shaft into irregular, imperfect rotation.

An additional advantage of the present invention, in this connection is that it operates above its critical, or resonant, frequency of rotation and rotates regularly and perfectly about a real axis of revolution. If a grinding wheel affixed to the shaft is dressed at the operating speed of the fluid supported and lubricated bearings, then the grinding wheel-shaft system will rotate perfectly about such real axis in a manner to permit "noiseless" precision surface grinding.

In other examples of the invention, the bushings or outer bearing members are supported by non-metallic structure and which, in some examples, are free to rotate within the housing member.

Still additional objects and advantages as well as further details of examples of the above and other novel features of the invention and their principles of operation, will become apparent and be best understood from a consideration of the following description taken in connection with the accompanying drawings which are presented by way of illustrative example only and in which:

FIGURE 12 is a sectional view of an apparatus illustrating another embodiment of the invention;

FIGURE 13 is a fragmentary sectional and perspective view of a portion of the structure of FIGURE 12;

FIGURE 14 is a view similar to FIGURE 13, showing an alternate form of the structure; and FIGURE 15 is a sectional view of an apparatus somewhat similar to that of FIGURE 12, illustrating still another variation hereof.

Referring to the figures in more detail it is stressed that the particulars shown are by way of example only and illustrative discussion only and are presented in the cause of providing what is believed to be the most useful and readily understood description of the principles and structural concepts of the invention. Specifically the detailed showing is not to be taken as a limitation upon the scope of the invetnion which is defined by the appended claims forming, along with the drawings, a part of this specification.

Figure 1:
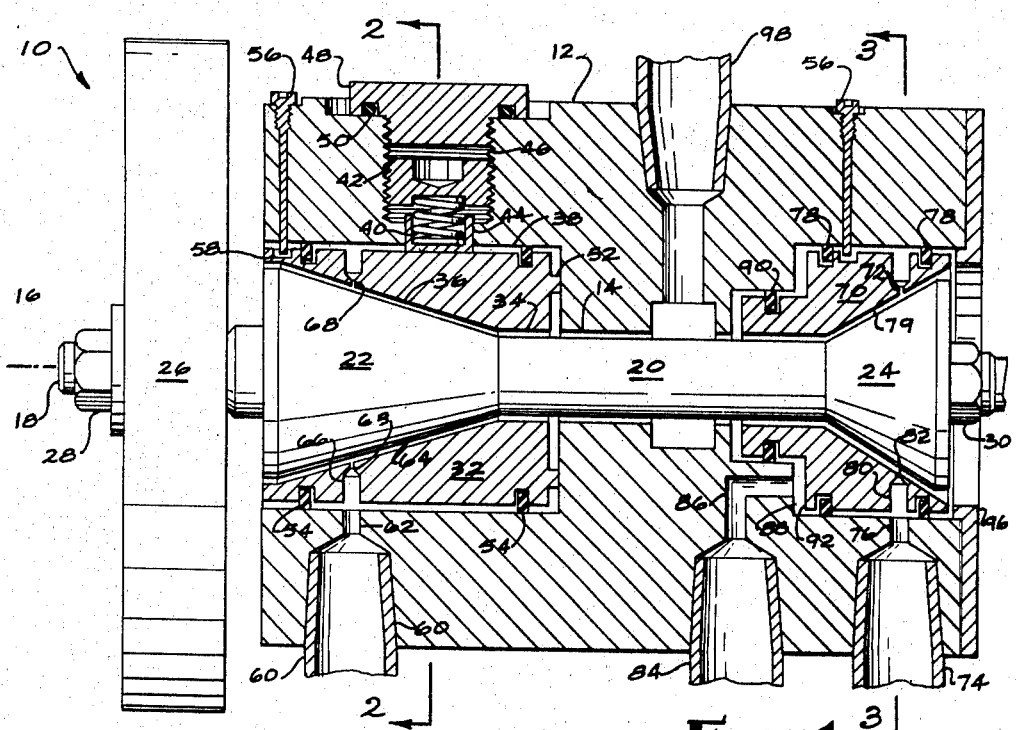
FIGURE 1 is a longitudinal sectional view of a fluid lubricated bearing of hydrostatic character constructed in accordance with the principles of the present invention.

In the example of the invention illustrated in FIGURE 1 a hydrostatic type of fluid or gas lubricated bearing system 10 is shown which includes an outer housing or frame member 12 which is non-rotating and which has a central opening 14 therethrough which is in the form of a figure of revolution about a system axis 16. Also disposed angularly, symmetrically about the system axis 16 is a rotating shaft 18 which includes a mid-portion 20, a forward conical journal 22, and an oppositely disposed rear conical jouranl 24. The shaft 18 may be a composite assembly including the mid-portion 20, the conical journals 22, 24 and a flywheel member 26 which are all held compressively on a central spindle between a pair of machine nuts 28, 30. It may be noted that member 26 may be a flywheel per se or may be a schematic representation of the load seen by the bearing system 10.

The conical surfaces of the journals 22, 24 are seen to be diverging from the axis 16 in opposite directions from each other and away from a plane disposed perpendicularly to the axis 16 between the two conical journals. It should be noted further that the angles of divergence are not necessarily equal. As in this example, the divergence of the conical surface of the journal 22 is considerably less than that of the conical journal 24. As will be explained more fully below, this arrangement tends to maximize the vertical load carrying capability of that portion of the bearing disposed nearest to the load 26 while the steeper angle of divergence associated with the conical journal 24 provides greater resistance to axial thrust of the rotating shaft 18.

Mounted within the housing or frame member 12 is, in this example, a non-rotating bearing 32 having a central opening 34 therethrough which is a figure of revolution disposed about the system axis 16 and which includes a conical bearing surface 36 which is formed with an angle of divergence from the system axis 16 which is equal to that of the conical surface of the conical journal 22, and which is juxtaposed with respect thereto by an annular-like distance which defines a containing region for a thin lubricating gas or other fluid film. The juxtaposed surfaces should be relatively smooth and true but need not be particularly highly polished.

The non-rotating bearing 32 is disposed within a cylindrical bore 38 in the frame member 12, the bore 38 being concentric with the system axis 16. The bearing 32 is supported within the bore 38 by a plurality of radially disposed, all metal, in this particular example, supporting springs 40 which extend from an adjusting screw 42 to a bearing cup 44, the latter being in compressive, supporting contact with the outer cylindrical surface of the non-rotating bearing 32. The threaded bore 46 for the adjusting screw 42 may be sealed by a screw cap 48 having a fitted O-ring 50 disposed compressively between it and the frame member 12. As may be seen this arrangement of adjustment for the supporting springs 40 provides considerable versatility for the system with regard to the radial alignment of the non-rotating frame member 12 and bearing 32 as well as the magnitude of the spring pre-load of the supporting springs 40. It is also noted that the oscillatory motion of the bearing 32 due to the restoring forces of the supporting springs 40 may be in part damped by the coulomb friction between the bearing cup 44 and its associated opening through the frame member 12. Additional coulomb friction for such damping purposes is provided in this example by an axially extending annular shoulder member 52 which extends from the bearing 32 into rubbing contact with the bottom of the cylindrical bore 38 in the frame member 12. A pair of sealing piston rings 54 which tend to contain the lubricating fluid may provide additional coulomb damping for the radially oscillatory motion of the floating, non-rotating bearing 32. To secure the bearing 32 against undesired axial or rotational motion with respect to the frame member 12 a locking pin 56 may be provided through a portion of the frame member 12 and project into a holding recess 58 relieved from the outer cylindrical surface of the bearing 32. As indicated in the figure, the relative diameters of the pin 56 and holding recess 58 are not critical. It should be emphasized that although the bearing 32 is described as non-rotating in the example of FIGURE 1, it may with some advantage, when desired, be constructed of a character to rotate either freely or to some limited extent about the system axis between the shaft or inner bearing member, and the frame member 12.

In this example the lubrication gas or other fluid is fed into the bearing system through an input conduit 60 which may be fitted into a gripping bore 62 in the frame member 12 as shown. The frame member 12 is then further ported from the bottom of the bore 60 to the bore 38 by a communicating passageway 62. Thusly there is provided communication between the input conduit 60 and that portion of the bore 38 between the piston rings 54. Communication from this region into the lubricating film region 64 is provided through an annular channel 66 which is, at angularly spaced intervals, ported to the gas film region 64 by small bores 68.

The other, rear, conical journal 24 is similarly disposed within a non-rotating, in this example, bearing 70 having an internal conical surface 72 which is juxtaposed about and spaced from the conical surface of the bearing 24 by a gap which defines a containing region for the thin lubricating fluid supporting film. Again, as with the bearing 32 and journal 22, the lubrication substance is supplied through an input conduit 74 and a communicating port 76 to a region within the frame member 12 between a pair of sealing piston rings 78 and into the inter-bearing support film space 79 through an annular channel 80 and a series of angularly spaced radially directed ports 82. A second locking pin 56 may be utilized as with the bearing 32 to limit, when and as desired, the axial and rotational motion of the bearing 70.

The mounting of the bearing 70 within the frame member 12 is not, in this example, spring supported as is the bearing 32 at the load end of the system. The bearing system 70 is however provided with an axial degree of freedom and its axial position determines the annular thickness of the lubricating fluid film regions 64, 79. This single control feature for both of the bearing films is achieved by virtue of the axial freedom of motion of the rotating shaft 20 so that if the bearing 70 is moved in a manner to decrease the film thickness, the shaft will move correspondingly to decrease both bearing films. In addition it may be seen that a vernier type of advantage is achieved in such adjustment because of the slope of the conical surfaces so that a given axial motion will affect the thickness of the gap by an amount which may be reduced by a factor of between 3 and 4, since the motion is decreased by the slope of the bearings and is divided between the two sets of juxtaposed surfaces.

The control of the position of the axially movable bearing 70 is achieved by fluid pressure, in this example, supplied through a conduit 84 which communicates through a port 86 into a bearing control region 88, between a piston ring 78 and a piston ring 90. In this connection it may be seen that pressure supplied to the region 88 will tend to urge the bearing 70 to the right, as viewed in the drawing, by virtue of the effect of that pressure upon a radially directed planar surface 92 on the left hand end of the bearing 70. To preclude the possibility of seizing of the rotating shaft by the stationary bearings in the event of loss of fluid film pressure, a bearing stop 96 is provided, as shown, against which the bearing 70 abuts in a manner to define the minimum support film thickness permissible without seizing.

In order further to minimize the probability of seizing as for example due to differential thermal expansions, the major parts of the bearing system 10 may be fabricated from the same material. Thusly as the rotating shaft is exposed to extreme temperatures so also will be the frame member 12 and the bearings 32, 70 and consequently, to a relatively high order of approximation, the critical parts will expand and contract in unison.

Figure 2:
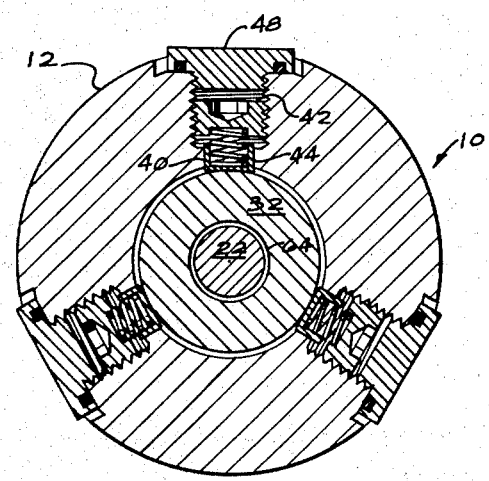
FIGURE 2 is a cross sectional view of the structure of FIGURE 1 taken along the lines 2—2 thereof.

Referring to FIGURE 2 which is a sectional view taken as indicated in FIGURE 1 across the left hand portion of the bearing system 10, the housing or frame member 12 is shown with the supporting springs 40 angularly balanced to support and radially align the non-rotating bearing 32 radially within the non-rotating frame member 12; and separated from it by the gas film gap 64 is the conical journal 22 of the rotating shaft. Again the screw caps 48 and the adjusting spring retaining screws 42 and the spring bearing cups 44 are shown.

Figure 3:
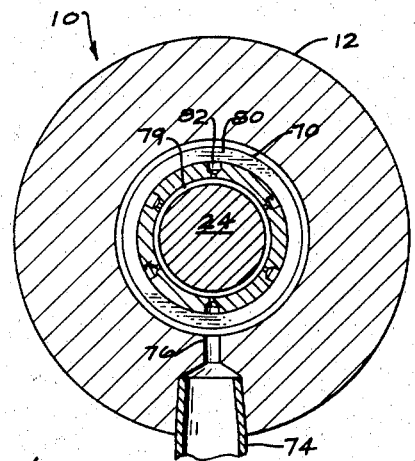
FIGURE 3 is a cross sectional view of the structure of FIGURE 1 taken along the lines 3—3 thereof.

Referring to FIGURE 3 the rear conical journal 24 is shown in cross section as being disposed within, and juxtaposed cylindrically angularly from, by the support film gap 79, the non-rotating bearing 70. In addition the side of the annular channel 80 and the ports 82 through the bearing 70 are shown. Surrounding the bearing 70 is disposed the housing member 12 through which the input conduit 74 and the port 76 communicate.

With further reference to the structure illustrated in FIGURES 1–3 it is noted that the coulomb friction between the shoulder member 52 of the non-rotating bearing 32 and the bottom of the bore 38 in the frame member 12 is indirectly maintained by the pressure in the bearing control region 88, in the following manner:

The pressure in the region 88 tends to urge the bearing 70 to the right which increases the fluid pressure in the film region 79 which in turn tends to urge the rotating shaft to the right, as viewed in the drawing. When the shaft is thusly urged, the pressure in the lubricating film region 64 about the journal 22 causes the non-rotating bearing 32 to be urged to the right thusly insuring a frictional contact between the annular shoulder member 52 and the frame member 12. Not previously noted is an output conduit 98 which provides a relief as desired for undesired fluid pressure in the central region of the bearing system, and provides the desired direction and magnitude of flow of the lubricating fluid.

Figure 4:
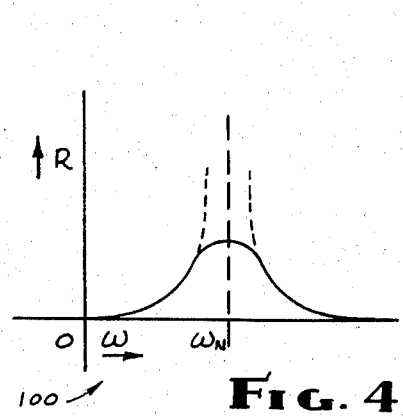
FIGURE 4 is a graph plotting amplitude of radial oscillation R on the ordinate as a function of rotational frequency $\omega$ on the abscissa.

In operation as the rotating shaft 18 is revolved about its axis 16 the gas lubricating film phenomenon begins to manifest itself and a load supporting film pressure is generated in the support film regions 64, 79, and, depending on the magnitude of the load, the hydrostatic pressure, and other circumstances of the operating environment, the rotating shaft may be supported against the forces of gravity. As higher rotating speeds are achieved, the film pressure increases, and support becomes even more positive. However because of the inherent imbalance in the structure and loading of the rotating shaft, it will not rotate perfectly about the axis 16 but rather will tend to oscillate in the radial and angular directions. At a critical frequency designated $\omega_n$ on the graph 100 of FIGURE 4, these imbalances in the shaft manifest themselves in a resonance phenomena. This is illustrated on the graph 100 by the increase of the amplitude R of the radial oscillation of the rotating shaft. In the region of $\omega_n$ which is the natural resonant frequency of the rotating shaft the vertically directed extensions of the curve on the graph 100 which are shown in dotted ines indicate that without damping of the oscillation the rotating shaft would wobble off axis without limit, the rotating shaft would make metal to metal contact with its journals, and the bearing would become damaged or at least ineffective for support at higher angular velocities, since it would not be possible to drive the speed of the bearing past its natural resonant frequency.

In accordance with the achievements of the present invention however, the tendency toward unlimited oscillation amplitude is precluded by coulomb friction damping reflected from the frictional contact of the bearing 32 through the lubricating support film to the rotating shaft. This is accomplished in the following manner. As the rotating shaft begins its radial oscillation, the bearing 32 is also driven in a radial oscillation through the coupling of the lubricating film; and the bearing 32 is permitted to oscillate in the radial direction by virtue of its spring suspension. In radially oscillating, however, the bearing 32 makes frictional contact with the stationary frame member 12 through the annular shoulder member 52, the sealing piston rings 54 and the spring bearing cups 44.

The damping of the radial oscillation of the bearing 32 is coupled back through the lubricating film region 64 to the oscillating rotating shaft 22 whereby the oscillations of the latter are indirectly but effectively damped. It is pointed out that the resilient, floating mounting of the bearing 32 provides protection against metal to metal contact with the rotating shaft in two ways: first, as the oscillating shaft approaches the bearing 32 the pressure of the fluid film moves the bearing 32 in the same direction so that although the gap distance is not drastically altered, the rotating shaft is permitted some freedom of radial motion; secondly, the radial oscillatory motion of the rotating shaft 22 is impeded and damped by the coulomb friction which is coupled to the shaft as described above.

It may further be seen that the controllable magnitude of the pressure in the control region 88 provides even greater versatility and flexibility for the system of the invention. In this connection the pressure may be adjusted in a manner best to accommodate the imbalance and the particular load experienced by the system and may, when desired, be programmed to best compensate for the resonance effects illustrated in the graph 100.

Figure 5:
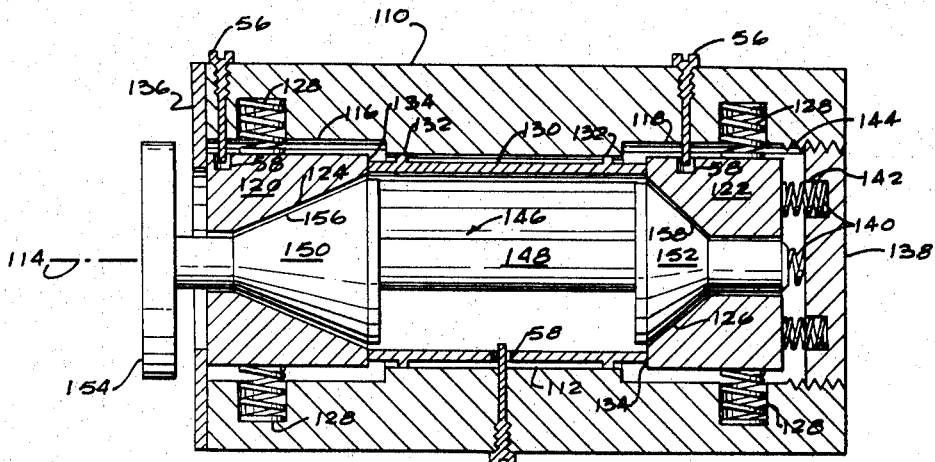
FIGURE 5 is a simplified longitudinal sectional view of a hydrodynamic example of the invention.

Referring to FIGURE 5 an embodiment of the invention is illustrated which is of the hydrodynamic type as opposed to the hydrostatic type shown in connection with FIGURE 1 above. In this example the necessary pressure for the lubricating fluid support film phenomenon is provided intrinsically by virtue of the geometries involved and the rotational kinematics utilized. In the figure a stationary frame member 110 is shown with a central cylindrical opening 112 formed therethrough symmetrically disposed about a system axis 114. A cylindrical bore 116, 118, is provided respectively in each end of the frame member 110 also symmetrically about the system axis 114 and communicating with the central opening 112. Disposed concentrically within each of the cylindrical bores 116, 118, is, again, in this example, a non-rotating bearing 120, 122 respectively. Each of the bearings 120, 122 is internally relieved to form a conical bearing surface 124, 126 respectively which diverge away from the system axis 114 in opposite directions. As in the previous example the angle of divergence of the conical bearing surface 124, which will be seen later to be the load end of the bearing, is smaller in order to provide a greater magnitude of horizontal projection surface to maximize the vertical load capability of the bearing system; while the conical bearing surface 126 is at a larger angle of divergence in order to maximize its thrust load capability.

Unlike the angles of divergence of the bearings 32, 70 of the previous example, however, the conical surfaces 124, 126 are seen to diverge away from the axis 114 toward each other while in the previous example the divergence was away from each other. Other considerations germane to the particular application will cause the skilled artisan to choose the most appropriate configuration for his application. It may be noted for example that when maximum vertical, that is, transverse to the axis, loading is desired for the bearing system, the configuration of FIGURE 1 will likely be chosen; and such a decision would be based upon the fact that the gas film lubricating pressure in this general type of bearing depends upon the relative tangential speeds between the rotating shaft and the outer bearing members. Accordingly, it is apparent that the conical configuration in FIGURE 1 provides the highest possible tangential speed for the gas film near the load and in addition a given gas film lubricating pressure will be achieved at the load end of the shaft at a significantly lower angular velocity of the shaft.

Each of the bearings 120, 122 is symmetrically floatingly supported within the respective bores of the frame member 110 by a plurality of all metal suspension springs 128. As emphasized above, the supporting function of the springs 128 may be achieved by other, non-metallic means such as, for example, plastic, gas, or liquid suspension system. Similarly the bearings 120, 122 may be supported by means which permit their rotation freely about the axis 114. In the manner shown each of the bearings is held in concentric alignment about the system axis 114 and is oscillatingly supported within the frame member with a centralizing restoring force determined by the effective combined spring constant of the plurality of mounting springs.

In this example a spacer cylinder 130 is mounted within the central opening 112 of the frame member 110 and is spaced therefrom by a plurality of annular collar extensions 132. These collar extensions make an axially sliding contact with the cylindrical wall of the central opening 112. The ends of the spacer cylinder 130 are disposed in contact with a radially disposed shoulder surface 134 formed on the juxtaposed ends of each of the bearings 120, 122. The bearings and the spacing cylinder 130 are normally held in compressive contact between a stopping member 136, which is affixed rigidly to the frame member 110 and partially occludes the opening of the cylindrical bore 116, and a threaded retaining plate 138. A set of axially bearing biasing springs 140 is retained within associated retaining holes 142 as shown. The compressed springs 140 bear against the left hand end wall of the non-rotating bearing 132 and urge it axially against the spacer cylinder 130 which communicates the compression to the bearing 120 and thence to the stopping member 136. The degree of compression sustained within the series just recited is determined by, and may be adjusted by, the degree to which the retaining plate 138 is threaded into the bore 118 by means of its matching threads 144 formed therein as shown. As in the structure shown in FIGURE 1 locking pins 56 may be provided through the frame member 110 and cooperate with associated holding recesses 58 to prevent, whenever desired, angular motion of the journals 120, 122 and the spacer cylinder 130.

Disposed radially within the bearings and frame member shown in FIGURE 5 is a rigid, rotating shaft 146 which includes a central portion 148 which is disposed supportingly between a load end bearing 150 and a thrust end bearing journal 152. Affixed to or coupled to the left hand end as viewed in the drawing, of the rotating shaft 146 is a load as represented by a flywheel 154. The load end bearing journal 150 is formed in this example, with a conical bearing surface 156 which is geometrically juxtaposed with respect to the conical bearing surface 124 of the bearing 120. In like manner the thrust end bearing journal 152 is provided with a conical bearing surface 158 which is juxtaposed with respect to the conical bearing surface 126 of the bearing 122.

The axial spacing of the journals 150, 152 is provided with a magnitude such that the gap thickness of the inter-bearing spacing of the juxtaposed conical surfaces is at its minimum permissible value to preclude metal to metal contact (this may best be determined by the length of the spacer cylinder 130) to the end that the critical minimum axial spacing of the non-rotating bearings will always be adequate to preclude metal to metal contact between the bearings and their journals. The spacer cylinder 130 and the rotating shaft 146 are preferably fabricated from the same material so that each has identical coefficients of thermal expansion. Further, to this end, the spacer cylinder 130 is substantially thermally isolated from the frame member 110 by the minimum contact areas of the annular collar extensions 132. Accordingly it may be noted that the rotating shaft 148 and the spacer cylinder 130 will experience substantially the same thermal influences.

In operation, the example of the invention illustrated in FIGURE 5 has floating bearings at both ends of the rotating shaft 146 and the resonance absorption phenomenon discussed in connection with the example of the invention of FIGURE 1 will occur with respect to both of the bearings in FIGURE 5 as the angular velocity of the rotating shaft 146 is turned up to very high speeds. Further to be noted in connection with this example is that the coulomb friction for damping the oscillatory energy of radially vibrating bearings 120, 122 is provided by the frictional contact between the bearings and the ends of the spacer cylinder 130. In addition the bearing 120 experiences a frictional contact with the stopping member 136; and the bearing 122 experiences, in certain cases, additional friction by sliding across the ends of the biasing springs 140. Further to be noted in connection with the operation of this example of the invention is the function of the bearing 122 to move axially against the biasing effect of the springs 140 as the dynamic fluid film pressure in the inter-bearing spaces increases. Thus a constant automatic balance is achieved during the operation of the system at all fluid supported speeds.

Figure 6:
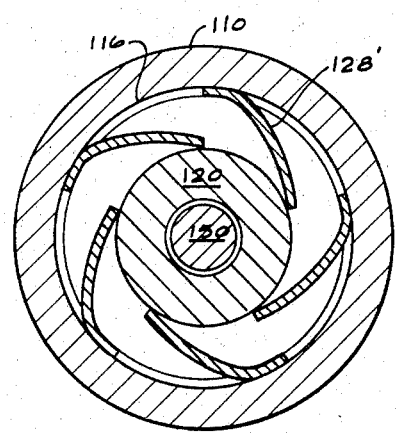
FIGURE 6 is a simplified cross sectional view of an alternative example of the invention.

Referring to FIGURE 6 there is illustrated an alternative embodiment of the invention in which the mounting springs 128 are replaced by a plurality of inwardly biased leaf type springs 128'. These may be formed integrally as a unit as by partially punching out fingers from a strip of spring metal stock and then mounted within the bore 116 of the frame member 110 in a manner to support the bearing 120 in concentric alignment about the journal 150 of the rotating shaft.

Figure 7:
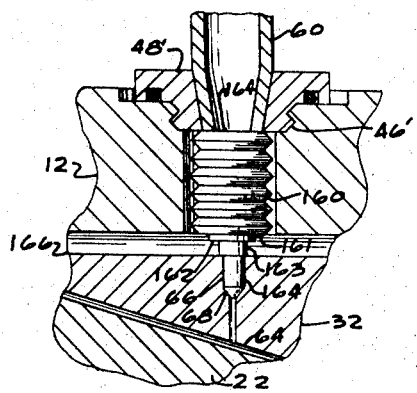
FIGURE 7 is a sectional view of a portion of an alternative embodiment of the invention.

Referring to FIGURE 7 an alternative example of the communication means between an external source of pressurized supporting fluid and the inter-bearing space of a hydrostatic type of fluid lubricated bearing is illustrated in which the lubricating fluid is fed directly to the inter-bearing space in a manner to eliminate the need for sealing rings between the journal and the frame. In the figure, which may be considered to be an alternative portion of the invention shown in FIGURE 1, for which reason like reference numerals will be used where deemed appropriate, the input conduit 60 is fitted into a central opening provided through the screw cap 48' which in turn is threaded into the bore 46'. Compressed between the metal screw cap 48' and the non-rotating bearing 32 is disposed an elastic, compressed bellows 160, the bottom surface 161 of which is sealed to the flange 162 of a tubular, rigid conduit 163 which has a reduced diameter portion 164 inserted in a sealed manner within the channel 66 and one of the bores 68. The flange 162 and the conduit 163 are open to provide a direct passageway between the interior of the bellows 160 and the interbearing space or fluid film region 64. The upper end of the bellows is coupled to the input conduit 60.

Clearance is provided about the bellows, in the frame member, to permit the required axial motion of the outer journals for maintaining the axial controlled correct support film thickness.

Figure 8:
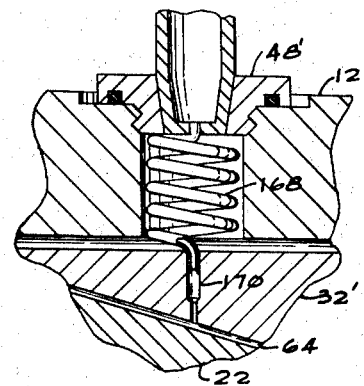
FIGURE 8 is a sectional view of a similar portion of another alternative structural example of the invention.

Referring to FIGURE 8 a different type of bellows or spring is utilized in a smilar manner dually to support a non-rotating bearing 32' within the frame member 12 and supply the lubricating fluid directly to the gas film bearing region. In this example a hollow spring 168 is compressed between the screw cap 48' and the non-rotating bearing 32'. The hollow spring 168 is terminated within a port 170 which communicates directly to the lubricating film region 64 between the bearing 32' and the rotating shaft journal 22.

In these latter examples, the function of the locking pin 56 of restricting or precluding rotary motion of the outer bearing member (see FIGURE 1) is preformed by the protrusion of the bottom end of the hollow spring 168 or bellows conduit 163 into the port 170 or 68 respectively; and the function of the sealing ring 54 is performed by the sealed, direct, resilient conduit between gas source and intra bearing space.

Figure 9:
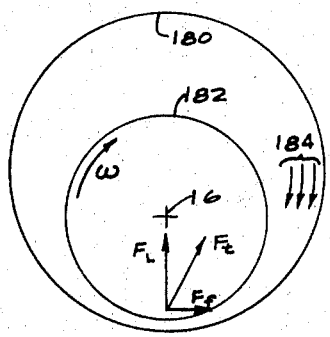
FIGURE 9 and FIGURE 10 are schematic diagrams useful in describing the phenomenon of whirl as suffered in prior art gas lubricated bearings.

Referring to FIGURE 9 the diagram shown illustrates the phenomenon of bearing whirl which, as discussed above, is a deleterious phenomenon suffered by gas lubricated bearings constructed in accordance with prior art techniques. In extremely exaggerated proportions the outer circle represents the non-rotating bearing surface 180 while the inner circle represents the outer surface of the rotating shaft 182. As indicated by the curved vector the shaft 182 is rotating at a clockwise angular velocity of $\omega$ in a manner to cause the circulation in the same direction of the inter bearing gas film represented by the vectors 184. The vector $F_L$ represents the reactive force exerted by the gas film on the rotating shaft 182. The smaller vector $F_f$ represents the drag resistance due to the viscous friction of the lubricating gas. The combination of these two reactive forces is represented by the vector $F_t$ and is seen to pass off-center through the rotating shaft 182, in a manner to apply a counterclockwise torque on the shaft 182.

Figure 10:
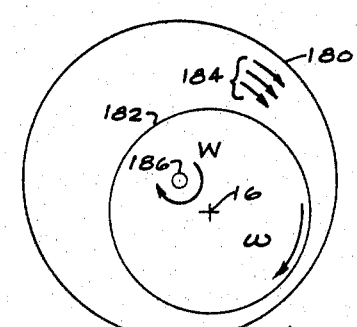

The result of the counterclockwise torque exerted by the reactive forces is the counterclockwise whirl represented by the W in the FIGURE 10 and is manifest as a rotation of the shaft about a whirl axis 186 while the shaft is spinning about its own axis 16 at the angular velocity $\omega$ in the opposite direction. Since these supporting and lubricating properties of the gas film depend upon the relative tangential velocities of the rotating shaft 182 and the non-rotating bearing 180, it may be seen that as $\omega$ approaches W, at least a portion of the supporting properties of the gas film will be cancelled out since the gas will have a velocity component of rotation associated with it that is the result of the velocity components due to rotation of the shaft 182 (which is equal and opposite to the spin $\omega$ of the shaft 182) minus the velocity component due to the whirl W of the shaft 182. The result is often a collapse of the supporting gas film layer with consequent damaging metal to metal contact of the relatively rotating parts.

Figure 11:
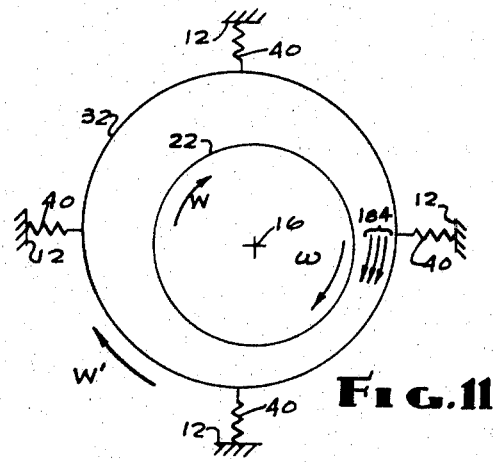
FIGURE 11 is a schematic diagram illustrating the operation of a fluid supported bearing constructed in accordance with the principles of the present invention.

Referring to FIGURE 11 the function of the gas or other fluid supported and lubricated bearing system of the present invention in obviating the whirl phenomenon is illustrated. In accordance with the present invention the non-rotating bearing 32 is spring supported, as shown in more detail in FIGURE 1, by a plurality of centrally restoring springs 40 which are all affixed at one end to the stationary frame member 12. The rotating shaft journal 22 spinning about the system axis 16 at an angular velocity $\omega$ creates the fluid supporting film represented by the vectors 184. Any whirl effects or tendencies are indicated by the vector W. As discussed earlier, however, the whirl effects are substantially eliminated in the practice of the present invention by two effects. First is a counteracting whirl W' experienced by the non-rotating bearing 32 as a result of the force equal and opposite to the force $F_t$ which the lubricating film exerts in accordance with Newton's second law on both the rotating shaft 22 and the outer bearing 32. Whether or not the bearing 32 is permitted to rotate, it is free to oscillate in an angular sense in synchronism with the virtual whirl of the rotating shaft 22. Secondly, because of the coulomb friction damping effects associated with the oscillating bearing 32 which are coupled through the supporting film back to the rotating shaft 22 the whirl energy is continually absorbed and thereby not permitted to build up to a deleterious level.

Referring to FIGURE 12, a portion of an example of the invention is illustrated which includes a supporting frame member 190 having a central opening 192 therethrough about the system axis 194. Also disposed symmetrically along and about the axis 194 is a rotating shaft member 196 which includes a central reduced diameter portion 198, a conical journal bearing portion 200 and an outer reduced diameter portion 202 by which the bearing assembly may be coupled to a utilization device, not shown.

An outer bearing assembly 204 having an internal conical bearing surface 206 is disposed within an enlarged diameter portion 208 of the central opening 192. The internal conical bearing surface 206 is provided with a conical angle of divergence with respect to the axis 194 which is substantially equal to that of the external conical bearing surface 210 of the conical journal bearing portion 200.

The outer bearing assembly 204 comprises a body member 212 which is substantially a figure of revolution about the system axis 194, and which has an outer end member 214 and an inner end member 216 which, together with a conical bearing section 218, form a spool-like body as shown. Each of the ends 214, 216, in this example, are formed with piston ring receiving channels 220, 222 respectively. Into these annular receiving channels are disposed a sealing piston ring 224, 226, respectively, which permit axial motion of the bearing assembly 204 within the enlarged diameter portion 208 of the central opening, through the body member 190. The end members 214, 216, are formed also with a retaining shoulder 228, 230, respectively, on their inner opposing edges. The tip portions 232 of a set of resilient spring finger members 234 are retained in a bridging relationship between the retaining shoulders 228, 230. The spring finger members are in this example formed integrally with and are carried by a central band 236 of increased thickness into which metal ball retaining channels 238 are provided, as shown, from its outer periphery. A set of supporting balls 240 is disposed within the plurality of circumferentially interrupted, ball retaining channels 238 formed about the periphery of the central band 236.

With reference to FIGURE 13 it may be seen more clearly that the ball retaining channels 238 are formed, in this example, with a circumferential length which is somewhat greater than the diameter of the support balls 240. With further reference to FIGURE 13 the relationship of the central band 236 to the resilient spring finger members 234 which it supports is shown. Similarly FIG- URE 14 shows a portion of a similar assembly which is different however in the respect that the retaining channel 238 is continuous about the entire outer periphery of the central band 236 so that, in a ball bearing race manner, the outer bearing assembly 204 of which it forms a part when assembled is free to rotate continuously within the enlarged diameter portion 208 of the central opening 192 in the supporting frame member 190.

The examples of the invention illustrated in FIGURES 12, 13 and 14 are of hydrostatic configuration in which the lubricating and supporting fluid is supplied to the bearing through a tubing member 242 which is sealed within a retaining bore 244 therefor. The bore 244 and hence the supply tubing member 242, communicates through a supply bore 246 to the contained region between the sealing piston rings 224, 226, from which region it passes, between the serrated spring finger members 234 through an array of supply ports 248 formed through the conical bearing section 218, and thence into the bearing gap region 250 between the conical journal portion 200 of the rotating shaft member 196 and the internal conical bearing surface 206 of the outer bearing section 218.

In operation, the bearing system functions in all essential respects as those of the previous figures. In this example, however, the frictional damping is achieved by the sliding contact between the piston rings 224, 226 and the sidewalls of their retaining channels 220, 222 in the outer bearing assembly 204. In addition, it may be noted that the relationships between the diameter of the balls 240, the outer diameter of the central band 236, the depth of the retaining channels 238, and the inner diameter of the portion 208 of the central opening through the supporting frame member 190 are selected whereby, when installed and assembled, the spring finger members 234 function as a spring suspension system for the bearing assembly 204 with the spring members being radially, inwardly deflected in a symmetrical manner.

Referring to FIGURE 15 an alternative example of the invention is illustrated which may be considered as being identical in all essential respects to the example illustrated in FIGURE 12 with like reference numerals applied there throughout except for the structure of the outer bearing member 254 and the feed system for the hydraulic or pneumatic bearing lubrication and support fluid. In this example, a fluid manifold chamber 256 is formed between the wall of a conical bearing section 258 and an annular cylindrical portion 260 both of which extend between the end portions 262, 264 of the outer bearing assembly 254. No piston rings are provided about the outer peripheries of these end members since the lubricating fluid prior to its distribution of the openings 248 into the bearing gap region 266 is contained within the fluid manifold chamber 256. The fluid is supplied thereto from a supply tubing member 242 provided through a supply bore 268 which communicates through the supporting frame member 190' through a cylindrical bore 270 into which a cylindrical feed extension 272 is inserted as shown. A bore 274 is provided therethrough which communicates in a fluid feed relationship from the bore 270 to the manifold chamber 256. About the periphery of the cylindrical feed extension 272 are formed, in this example, a pair of piston ring retaining, annular channels 276 into which are placed a pair of sealing piston rings 278 which compressively engage in a sealing relationship the cylindrical surface of the bore 270.

In the operation of this example of the invention, the damping friction for radial as well as axial motion of the bearing assembly 254 is provided by means of the contact between the sealing piston rings and the sidewalls of their retaining channels 276. By this means a smaller magnitude of friction and a greater control thereover may be achieved as desired for particular applications of bearings constructed and utilized in accordance with the principles and structural concepts of the invention.

There has thus been described a number of examples of various structural and method aspects of a fluid supported and lubricated bearing system which achieves the objects and exhibits the advantages set forth hereinabove.

What is claimed is:

1. A gas lubricated bearing supporting a shaft in relation to an external frame member, for relative rotation therebetween, comprising:
   a journal means affixed to said shaft;
   a bearing member receiving said journal means whereas to define a tapered interior space that is interior of said bearing member for receiving said lubricating gas, to support said journal means;
   a support means supporting said bearing member in relation to said external frame member, whereby to define an exterior space that is exterior of said bearing member for receiving lubricating gas to afford said bearing a degree of freedom of movement relative to said external frame member;
   means for supplying a flow of lubricating gas to said interior and exterior spaces; and
   means for frictionally engaging said bearing member whereby to draw energy therefrom.

2. A bearing according to claim 1 wherein said means for frictionally engaging said bearing member includes coulomb friction means whereby to dissipate energy from said bearing member.

3. A bearing according to claim 2 wherein said support means comprises a structure of rigid substantially non-yielding non elastomeric material.

4. A bearing according to claim 2 further including sealing ring means disposed to substantially close at least one of said defined spaces.

5. A bearing according to claim 2 wherein said support means includes at least one spring for yieldably supporting said bearing member.

6. A bearing according to claim 2 wherein at least one annular surface of said bearing member extends to have a component extending perpendicular to said shaft means.

7. A bearing according to claim 2, wherein said support means comprises a structure of rigid, substantially non-yielding metal-like material; further including sealing ring means disposed to substantially close at least one of said defined spaces wherein at least one annular surface of said bearing means extends to have a component extending perpendicular to said shaft means.

8. Fluid supported and lubricated bearing comprising; a stationary frame member defining therethrough an opening with a longitudinal axis; a rotary body disposed within said opening and having an axis of revolution substantially coincident with said longitudinal axis; at least one journal surface on said rotary body; an outer bearing including a plurality of pairs of axially spaced support locations; resilient supporting means disposed within said frame member in a supporting relation about said outer bearing and being of the character to exert a centralizing restoring supporting force thereon, said bearing having an internal surface geometrically similar to that of said journal surface and being juxtaposed thereabout with a spacing of juxtaposition which defines a region for a low viscosity lubricating and supporting film said resilient supporting means further including a plurality of finger leaf spring members having spaced ends and each being disposed suspendingly between a predetermined one of said pairs of axially spaced support locations with each one of said ends in radially compressive contact with a respective one of said support locations and each including supporting retaining means for holding a supporting ball at a point on the spring member intermediate its said ends and in which said resilient supporting means further includes a plurality of supporting balls, individual ones of which are disposed in said retaining means in radially compressive contact between its respective said spring member and said stationary frame member; lubricating and supporting fluid disposed therewithin whereby said rotary body is radially, force-coupled to said bearing; and frictional damping means coupled between said outer bearing and said frame member for absorbing oscillatory energy of said rotary body.

9. The invention according to claim 8 which further includes a pair of spaced sealing piston rings disposed concentrically about said outer bearing in frictional contact with the outer periphery thereof and with said stationary frame member, each of said piston rings being disposed axially outwardly from said axially spaced support locations of said outer bearing.

10. The invention according to claim 8 which further includes a fluid supply chamber carried by said frame member and in which said outer bearing includes a fluid manifold chamber disposed about said internal surface and which is ported to said lubricating and supporting film region for distributing said fluid thereto and in which said outer bearing further includes an axially extending fluid supply rigid tube carried thereby which extends in fluid flow communication between said fluid manifold chamber of said outer bearing and said fluid supply chamber of said frame member, and which further includes piston ring means disposed about said tube in frictional fluid retaining contact between its outer surface and said stationary frame member.

11. The invention according to claim 8 in which a plurality of said finger leaf spring members are joined together at points intermediate their said ends whereby a circumferentially integral structure is formed of said spring members.

References Cited
UNITED STATES PATENTS

| | | | |
|---|---|---|---|
| 3,058,785 | 10/1962 | Steele | 308—9 |
| 3,249,390 | 5/1966 | Schwortzman | 308—122 |

MARTIN P. SCHWADRON, Primary Examiner

F. SUSKO, Assistant Examiner